Jan. 15, 1935. H. E. VON SEGGERN ET AL 1,987,881
WATER COOLER
Filed June 29, 1932 2 Sheets-Sheet 1

Inventors
HENRY E. VON SEGGERN
ERNEST A. VON SEGGERN
By W. B. Bowman
Attorney

Jan. 15, 1935. H. E. VON SEGGERN ET AL 1,987,881
WATER COOLER
Filed June 29, 1932 2 Sheets-Sheet 2
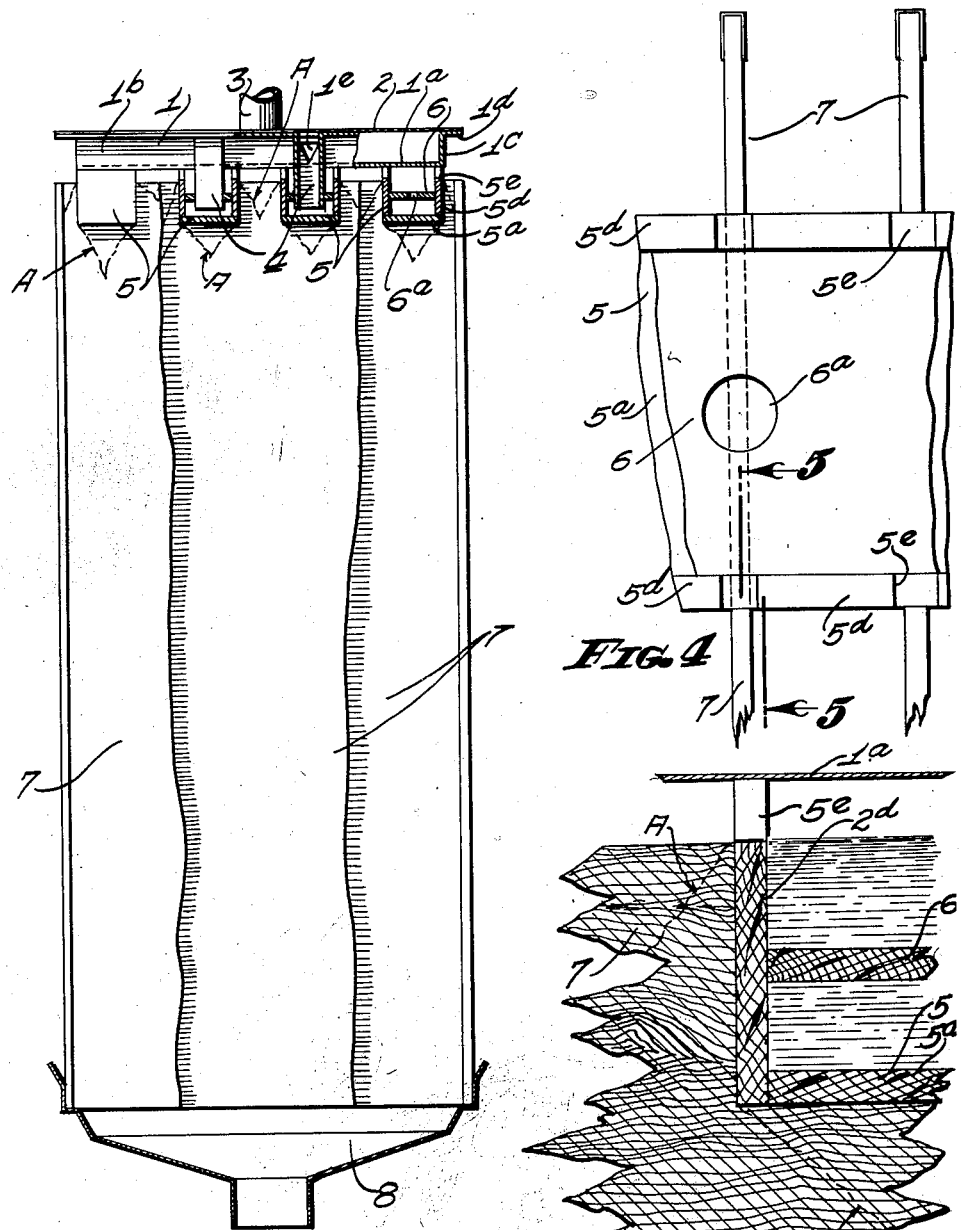
Inventor
HENRY E. VON SEGGERN
ERNEST A. VON SEGGERN
By A. B. Bowman
Attorney Patented Jan. 15, 1935

1,987,881

UNITED STATES PATENT OFFICE 1,987,881

WATER COOLER

Henry E. von Seggern and Ernest A. von Seggern, Escondido, Calif.

Application June 29, 1932, Serial No. 619,898

11 Claims. (Cl. 261—112)

Our invention relates to water coolers, and the objects of our invention are:

First, to provide a water cooler of the type which utilizes the evaporation of a portion of the water to cool the remaining portion;

Second, to provide a water cooler of this class in which the water is caused to flow in thin sheets upon a plurality of partitions over which air is passed, which reduces to a minimum the increase in humidity of the air as it passes through the cooler, and reduces to a minimum the quantity of water lost through evaporation, while at the same time it produces the maximum cooling of the remaining water by reason of the fact that all water which is undergoing evaporation is in direct contact with the water remaining on the partitions;

Third, to provide a water cooler of this class which incorporates a novel water distributing means whereby a large quantity of water may be divided into a large number of small streams without the use of small openings or other obstructions which tend to clog;

Fourth, to provide a water cooler of this class which is particularly adapted to operate for long periods without cleaning or any attention whatsoever;

Fifth, to provide a water cooler of this class which is adaptable to the requirements of various installations, being operable in a forced air draft or when exposed to natural wind currents;

Sixth, to provide a water cooler of this class which is particularly applicable for use in conjunction with our cooling apparatus described in our copending application, Serial No. 619,897;

Seventh, to provide on the whole a novelly constructed water cooler which is durable, efficient in its action and which will not readily deteriorate or get out of order.

Figure 1:
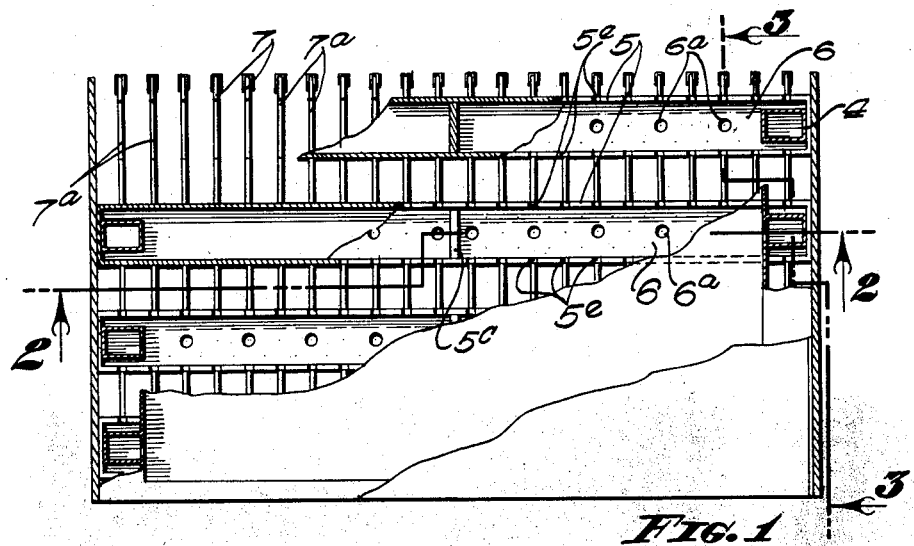
Figure 2:
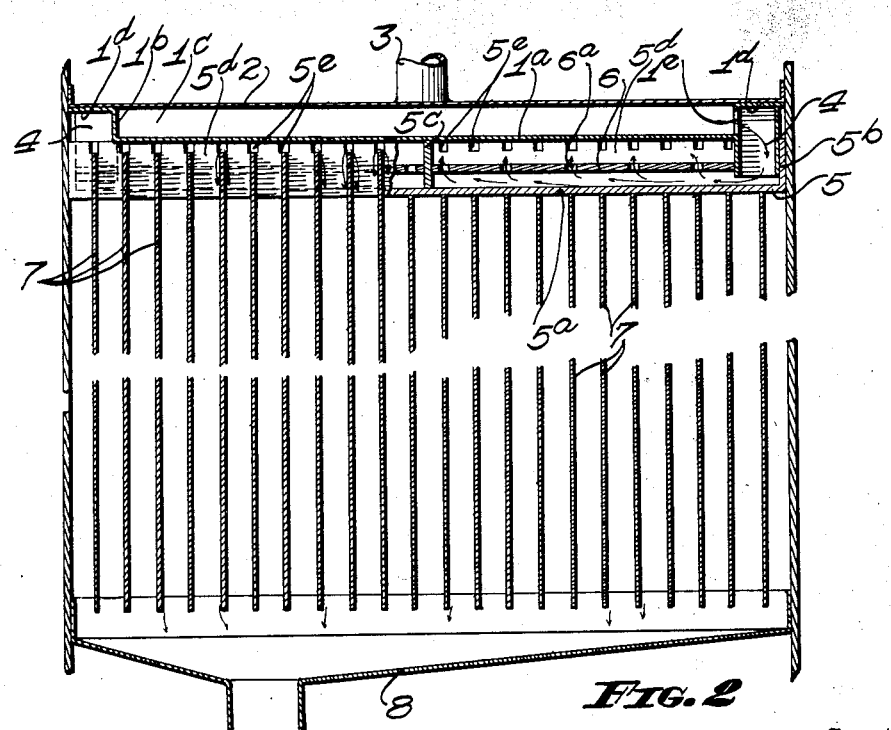

With these and other objects in view as will appear hereinafter, our invention consists of certain novel features of construction, combination and arrangement of parts and portions as will be hereinafter described in detail and particularly set forth in the appended claims, reference being had to the accompanying drawings and to the characters of reference thereon which form a part of this application, in which:

Figure 1 is a plan view of our water cooler with parts and portions broken away and in section to facilitate the illustration; Fig. 2 is a fragmentary sectional view thereof through 2—2 of Fig. 1; Fig. 3 is another fragmentary sectional view taken at right angles to Fig. 2 through 3—3 of Fig. 1 with parts and portions shown in elevation; Fig. 4 is an enlarged fragmentary plan view of one of the distributer troughs and a portion of the partition member; and Fig. 5 is a fragmentary sectional view thereof through 5—5 of Fig. 4.

Similar characters of reference refer to similar parts and portions throughout the several views of the drawings.

Pan 1, cover plate 2, inlet pipe 3, spouts 4, distributer troughs 5, grid members 6, water spreading plates 7, and collector basin 8, constitute the principal parts and portions of our novel water cooler.

A shallow pan 1 is provided which comprises a flat bottom portion 1a, end walls 1b, and side walls 1c. The walls of the pan 1 are provided with outwardly extending flanges 1d at their upper margins which support a flat cover plate 2 adapted to extend over the pan 1 and form therewith a shallow chamber. The cover plate 2 is provided with an inlet pipe 3 preferably disposed at its central portion.

The end walls 1b of the pan 1 are provided with several apertures 1e. The apertures of one end wall are paired with the apertures of the other. Arranged outwardly from each aperture 1e and disposed underneath the flange 1d is a downwardly directed spout 4 open at its lower end.

The spouts corresponding to each pair of apertures extend into a distributer trough 5, inwardly and adjacent the ends thereof. Each distributer trough is elongated and comprises a bottom member 5a, end walls 5b, a centrally disposed dividing wall 5c, and side walls 5d. Each half of each distributer trough is provided with a grid member 6 which extends between the dividing wall 5c and an end wall 5b so as to divide the trough horizontally. The spouts 4 extend below the grids 6 so that water from the spouts flows into the troughs underneath said grids. The grids 6 are provided with a plurality of openings 6a which allow water to upwell into the upper portions of the distributer troughs.

The side walls 5d of the distributer troughs are provided with a plurality of notches 5e cut therein from their upper margins. The notches 5e of the several distributer troughs are arranged in rows extending transversely with respect to said troughs. A water spreading plate 7 is provided for each row of notches 5e. Each plate 7 is provided with a series of recesses 7a in its upper edge which receive the troughs 5, the spreading plates being positioned vertically. The recesses 7a are of such depth that the upper edges of the water spreading plates are substantially flush with the notches 5e. Also it should be noted that the water spreading plates are somewhat thinner than the width of the notches 5e so that said notches extend laterally beyond the surfaces of the water spreading plates. The lower ends of the water distributing plates 7 overhang a collector basin 8.

Operation of our water cooler is as follows: The water flows in the inlet pipe 3 and spreads out in the pan 1 so as to flow through the apertures 1e downwardly through the spouts 4 then laterally inwardly towards the dividing wall 5c. The water then upwells through the grids 6 and overflows the several notches 5e. Whereupon the multiplicity of small streams flowing out of the notches 5e divide and flow down opposite sides of the water spreading plates 7. It has been found that thin wood affords the best material for the construction of the water spreading plates. The wood is arranged with the grain running horizontally, that is, transversely to the direction of water flow. The film of water poured onto the spreading plates tends to flow along the grain of the wood and thereby spreads out and joins the streams discharged from the other notches of the same row. This lateral spreading of the streams of water is indicated by the converging sets of lines in Figs. 3 and 5, designated A. An air stream flowing between the several water spreading plates evaporates water from the surface of the films and thereby cools the remaining water which drains down into the basin 8.

Though we have shown and described a particular construction, combination and arrangement of parts and portions, we do not wish to be limited to this particular construction, combination and arrangement, but desire to include in the scope of our invention the construction, combination and arrangement substantially as set forth in the appended claims.

Having thus described our invention, what we claim as new and desire to secure by Letters Patent is:

1. In a water cooler, a plurality of vertically arranged parallel disposed water spreading plates forming spaces therebetween for the circulation of air streams, said water spreading plates provided with recesses in their upper edges, a plurality of water distributing troughs positioned in said recesses and extending transversely across the water spreading plates, said water distributing troughs provided with notches disposed so as to register with the upper edges of said water spreading plates so as to discharge a multiplicity of water streams thereon whereby said water streams divide and flow down the surfaces of said water spreading plates, said water spreading plates including means tending to spread said water streams laterally whereby said water streams unite to form films coating the surfaces of said water spreading plates.

2. In a water cooler, a series of water distributing troughs arranged side by side in spaced relation, a plurality of water spreading plates positioned underneath said troughs, including projections extending between said troughs, and means tending to spread laterally water directed thereon so as to form films of water on the surfaces of said plates, and outlets for said troughs positioned in registration with the upper edges of said projections for directing a multiplicity of water streams thereupon whereby said water streams divide, flow down the surfaces of said plates and form films of water coating said surfaces.

3. In a water cooler, a plurality of vertically arranged parallel disposed water spreading plates forming spaces therebetween for the circulation of air streams, said water spreading plates provided with recesses in their upper edges, a plurality of water distributing troughs positioned in said recesses and extending transversely across the water spreading plates, said water distributing troughs provided with notches disposed so as to register with the upper edges of said water spreading plates so as to discharge a multiplicity of water streams thereon whereby said water streams divide and flow down the surfaces of said water spreading plates, foraminous partitions extending horizontally in said water distributing troughs between said notches and the bottoms of said troughs, and means for directing water into said troughs below said partitions whereby the water surface in said troughs is maintained substantially level so that distribution to said notches is equalized, said water spreading plates including means tending to spread said water streams laterally whereby said water streams unite to form films coating the surfaces of said water spreading plates.

4. In a water cooler, a series of water distributing troughs arranged side by side in spaced relation, a plurality of water spreading plates positioned underneath said troughs, including projections extending between said troughs, means tending to spread laterally water directed thereon so as to form films of water on the surfaces of said plates, outlets for said troughs positioned in registration with the upper edges of said projections for directing a multiplicity of water streams thereupon whereby said water streams divide, flow down the surfaces of said plates and form films of water coating said surfaces, foraminous partitions extending horizontally in said troughs between said outlets and the bottoms of said troughs, and means for directing water into said troughs below said partitions whereby the water surface in said troughs is maintained substantially level so that distribution to said outlets is equalized.

5. In a water cooler, a water receiving pan, paired down spouts at the ends thereof, a series of spaced apart horizontally disposed troughs extending underneath said pan one for each pair of down spouts, the members of each pair of spouts being disposed at the extremities of the corresponding trough, a plurality of notches formed in the upper walls of said troughs and arranged in rows traversing said troughs, and a plurality of water distributing plates one for each row of notches arranged to receive water therefrom, the surfaces of said distributing plates being of such character that streams of water directed thereon tend to spread laterally and unite in films.

6. In a water cooler, a water receiving pan, paired down spouts at the ends thereof, a series of spaced apart horizontally disposed troughs extending underneath said pan one for each pair of down spouts each of said troughs provided with a plurality of notches formed in its upper walls, the members of each pair of spouts being disposed at the extremities of the corresponding trough, and a plurality of water distributing plates disposed transversely with respect to said troughs and including projections extending between said trough into registry with said notches whereby said notches direct streams of water upon the upper edges of said distributing plates, so as to divide and flow down the surfaces thereof.

7. In a water cooler, a water receiving pan, down spouts therefrom, a series of spaced apart horizontally disposed troughs extending underneath said pan one for each down spout, the members of each spout being disposed at the extremities of the corresponding trough, and a plurality of vertically disposed water distributing plates arranged to receive water therefrom, the vertical surfaces of said distributing plates being of such character that streams of water directed thereon tend to spread laterally and unite in films.

8. In a water cooler, a water receiving pan, down spouts at the end thereof, a series of spaced apart horizontally disposed troughs extending underneath said pan one for each spout, the members of each spout being disposed at the extremity of the corresponding trough, said troughs provided with a perforate grid member spaced from the bottom thereof whereby liquid passing down said spouts passes into the bottom of said trough below said grid member, then upwardly through said grid member to provide quiet circulation and distribution of the liquid, and a plurality of water distributing plates arranged to receive water therefrom, the surfaces of said distributing plates being of such character that streams of water spread thereon tend to spread laterally and unite in films.

9. In a water cooler, a water receiving pan, down spouts at the end thereof, a series of spaced apart horizontally disposed troughs extending underneath said pan one for each spout, the members of each spout being disposed at the extremity of the corresponding trough, said troughs provided with a perforate grid member spaced from the bottom thereof whereby liquid passing down said spouts passes into the bottom of said trough below said grid member, then upwardly through said grid member to provide quiet circulation and distribution of the liquid, and a plurality of water distributing plates arranged to receive water therefrom.

10. In a water cooler, a series of spaced apart horizontally disposed troughs, said troughs provided with a perforate grid member spaced from the bottom thereof whereby liquid introduced into the bottom of said troughs below said grid member passes upwardly through said grid member to provide quiet circulation and distribution of the liquid, and a plurality of water distributing plates arranged to receive water therefrom.

11. In a water cooler, a series of spaced apart horizontally disposed troughs, said troughs provided with a perforate grid member spaced from the bottom thereof whereby liquid introduced into the bottom of said troughs below said grid member passes upwardly through said grid member to provide quiet circulation and distribution of the liquid, and a plurality of vertically disposed water distributing plates arranged to receive water therefrom, the surfaces of said distributing plates being of such character that streams of water spread thereon tend to separate laterally and unite in films.

HENRY E. von SEGGERN.
ERNEST A. von SEGGERN.